United States Patent [19]

Ogura et al.

[11] Patent Number: 4,990,867
[45] Date of Patent: Feb. 5, 1991

[54] MODULATOR

[75] Inventors: Koji Ogura, Yokohama; Mutsumu Serizawa, Tokyo, both of Japan

[73] Assignee: Kabushiki Kaisha Toshiba, Kawasaki, Japan

[21] Appl. No.: 521,367

[22] Filed: May 10, 1990

[30] Foreign Application Priority Data

May 10, 1989 [JP] Japan .................................. 1-116877

[51] Int. Cl.⁵ .............................................. H03C 3/00
[52] U.S. Cl. ...................................... 332/102; 375/39
[58] Field of Search ...................... 332/102, 103, 104; 375/39

[56] References Cited

U.S. PATENT DOCUMENTS 4,751,478 6/1988 Yoshida ............................. 332/104

FOREIGN PATENT DOCUMENTS 64-78559 3/1989 Japan .
64-78560 3/1989 Japan .
64-81417 3/1989 Japan .

Primary Examiner—Robert J. Pascal
Attorney, Agent, or Firm—Oblon, Spivak, McClelland, Maier & Neustadt

[57] ABSTRACT

In a modulator for converting two digital signals of I channel and Q channel in base band into analog signals and for converting a component of the signals whose phase is the same as a carrier and another component of the signals whose phase is orthogonal to the carrier so as to produce an orthogonally modulated wave, the two digital signals are connected to one signal train by time-sharing and multiplexing them and the converted analog signals are separated to two analog signals for the I channel and the Q channel and thereby a digital modulator can be structured by using only one digital/analog converter resulting in reducing the adjustment points and the production cost.

5 Claims, 8 Drawing Sheets

(a) I ch DATA

(b) Q ch DATA

⇓ MAPPING

(c) I ch

(d) Q ch (e) I ch CLOCK

(f) Q ch CLOCK

⇓

(g) I ch FILTER

(h) Q ch FILTER

⇓

(i) I ch SIGNAL (j) Q ch SIGNAL

⇓ D FLIP FLOP (k) I ch OUTPUT

(ℓ) Q ch OUTPUT

FIG. 5

(a) Ich (b) Qch (c) Ich SWITCH (d) Qch SWITCH

MODULATOR

BACKGROUND OF THE INVENTION

1. Field of the Invention and Related Art Statement

The present invention relates to a digital modulator.

Thus far, modulators for modulating carriers using digital signals in the base band and for obtaining IF (RF) band modulation signals use an analog signal process.

Figure 12:
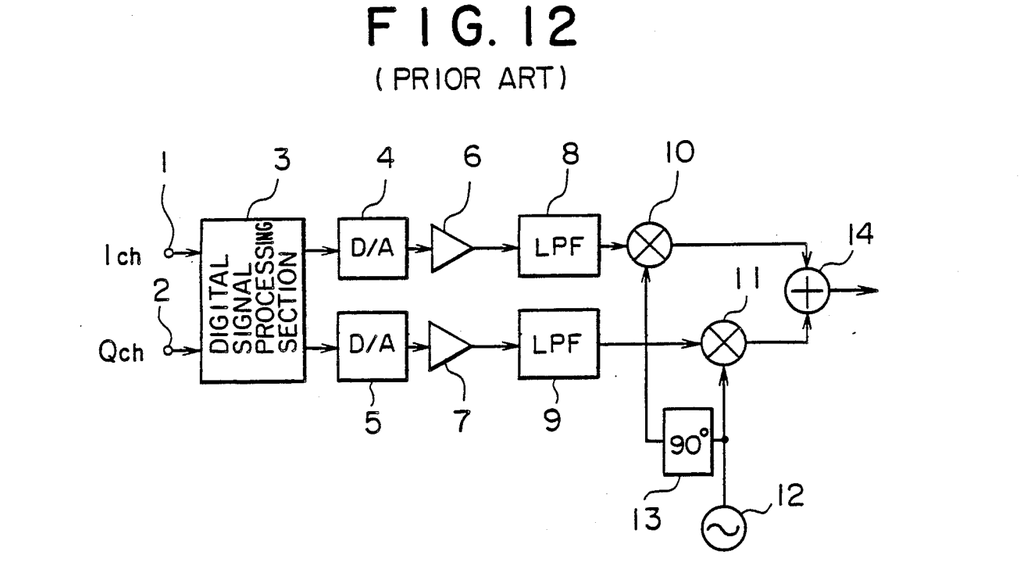
FIG. 12 is a block diagram showing the structure of a conventional modulator.

FIG. 12 is a view showing a general structure of an orthogonal modulator for processing analog signals.

Digital input signals which are input from an I channel data input point I and a Q channel data input point 2 are converted into analog signals by D/A converters 4 and 5 via digital signal processing section 3, respectively. After that, the signals pass through (operational) amplifiers 6 and 7 and low pass filters 8 and 9, respectively. Then, a component of the signals, whose phase is the same as a reference carrier 12, and another component of the signals, whose phase is orthogonal to the reference carrier 12 via a phase shifting device 13 are modulated by multipliers 10 and 11, respectively. These output signals are mixed by an adder 14 and an orthogonally modulated wave is obtained.

However, when the orthogonal modulation is conducted with the orthogonal modulator for processing analog signals, there are many adjustment points.

First, when an input digital signal is converted into an analog signal by the D/A converters 4 and 5, an DC offset takes place. In other words, although the input digital signal should be a waveform whose amplitude is based on 0 V, the waveform varies from a particular DC level due to the nature of the D/A converters 4 and 5. When such a DC offset is present, the DC component also causes the carrier to be modulated and thereby a correct modulation wave cannot be obtained. Thus, in the modulator described above the operational amplifiers 6 and 7 are disposed downstream of the D/A converters 4 and 5. By adjusting the operational amplifiers 6 and 7, the DC offset is removed.

Second, unless the amplification of the I channel signal which is input to the adder 14 is balanced with that of the Q channel signal, a correct orthogonal modulation wave cannot be obtained. In other words the amplitude of the I channel signal which passes through the low pass filter 8 should accord with that of the I channel signal which passes through the low pass filter 9. However, each amplitude is deflected by individual fluctuation of the characteristics of the D/A converters 4 and 5 and the low pass filters 6 and 7. Thus, in such a modulator, to balance the amplitudes, the operational amplifiers 6 and 7 downstream of the D/A converters 4 and 5 are adjusted.

Third, the input impedance of the I channel of the digital input signal should be precisely matched with that of the Q channel thereof. Thus, when the circuit is made, these impedances should be adjusted.

In the orthogonal modulator for processing an analog signal, there are many points to adjust and thereby much adjustment work is required. Thus, the cost of the modulator becomes expensive.

In addition, for adjusting each input impedance of the I channel and the Q channel of the digital input signal, an impedance matching circuit which consumes large power is required and thereby the modulator becomes a large power consumption type.

SUMMARY OF THE INVENTION

An object of the present invention is to provide a modulator wherein the number of adjustment points is small, particularly, to provide a modulator free from the adjustments for operational amplifiers.

Another object of the present invention is to provide a modulator free from the adjustment of a DC offset.

Another object of the present invention is to provide a modulator free from the adjustment of each input impedance of I channel and Q channel of an input signal.

Another object of the present invention is to provide a modulator wherein the number of output lines from a digital signal processing section being accommodated in the LSI is reduces.

The present invention is a modulator for converting two digital signals for an I channel and a Q channel in the base band into analog signals and for modulating a component of the signals whose phase is the same as a carrier and another component of the signals whose phase is orthogonal to the carrier, comprising signal connection means for connecting the two signals of said I channel and said Q channel to one signal train by time-sharing and multiplexing them, a digital/analog converter for converting a signal connected by said signal connection means into an analog signal, and signal separation means for separating an output analog signal converted by said digital/analog converter to two analog signals of said I channel and said Q channel.

The present invention is also the modulator according to the above modulator wherein a sampling points in the base band of said digital signals are offset between a time axis of said I channel and that of said Q channel.

The present invention is also the modulator according to the modulator wherein said signal connection means causes said adjacent signal trains to be grounded for a particular time period when connecting the two signals to one signal train by time-sharing and multiplexing them.

The present invention is also the modulator according to the modulator wherein a digital signal processing section is provided at least for mapping and filtering signals, said signal connection means being accommodated in said digital signal process section.

The present invention is also the modulator according to the modulator wherein a digital signal processing section is provided at least for mapping and filtering signals, said digital signal processing section and at least one of said signal connection means, said digital/analog converter, and said signal separation means being accommodated in the same LSI.

DETAILED DESCRIPTION OF THE PREFERRED EMBODIMENTS

By referring to the attached drawings embodiments of the present invention will be described in detail.

Figure 1:
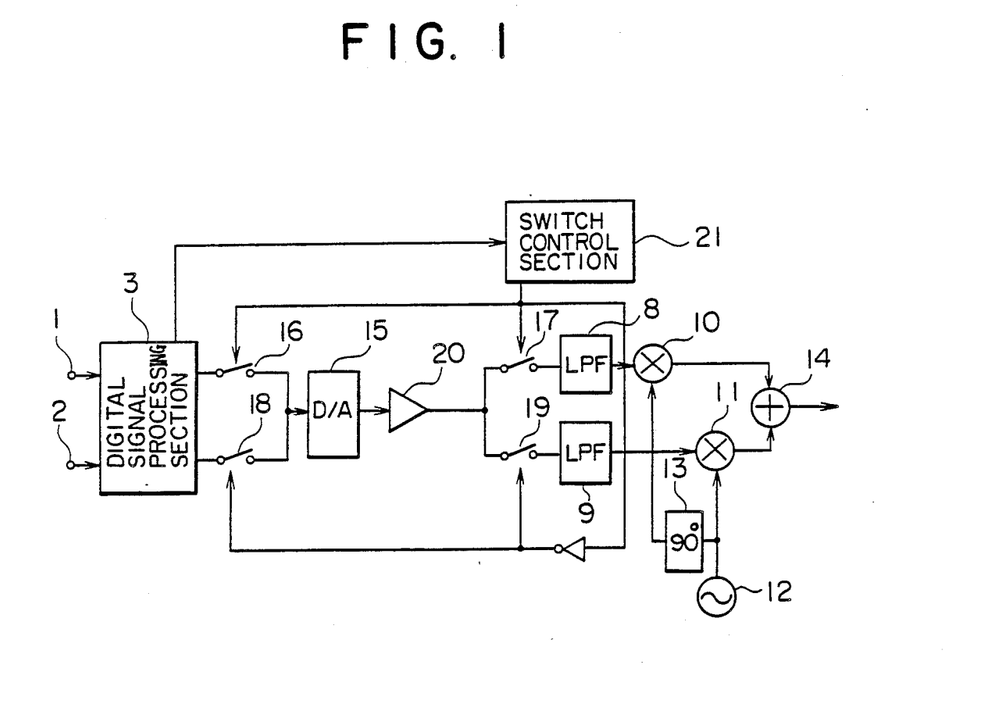
FIG. 1 is a block diagram showing the structure of a modulator according to an embodiment of the present invention.

FIG. 1 is a block diagram showing the structure of a modulator of an embodiment according to the present invention.

Figure 2:
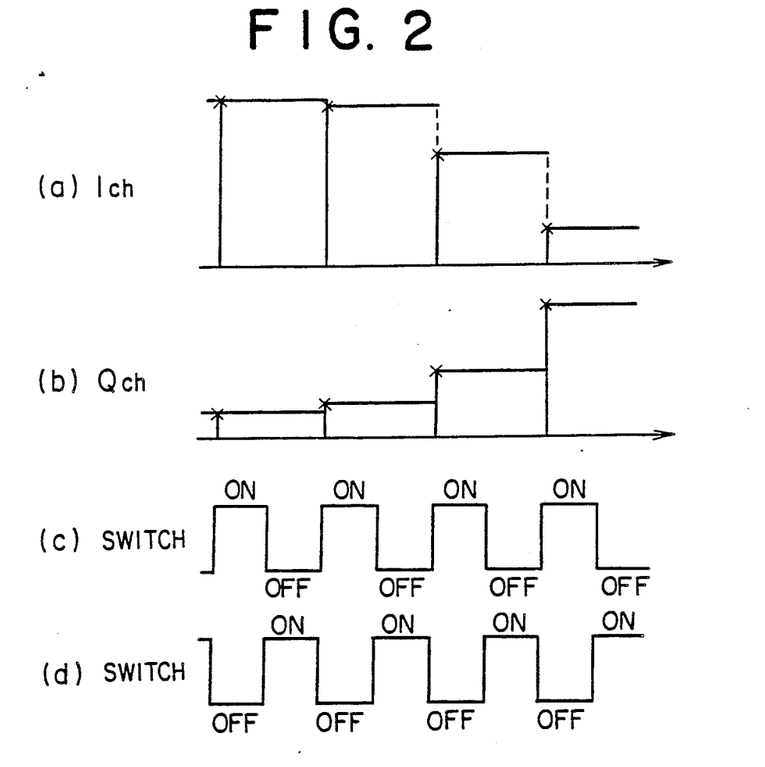
FIG. 2 is a time chart describing the operation of the embodiment shown in FIG. 1.

As shown in FIG. 1, I channel data and Q channel data which are input form data input points 1 and 2 are mapped and filtered by a digital signal processing section 3. Thus, digital I channel signal(FIG. 2 (a)) and digital Q channel signal (FIG. 2(b)) take place. Although these signals are discrete to the time axis, since their computation time periods by D/A converters and the like are required, the output signal from the digital signal processing section 3 is held until the next signal is output as shown in FIGS. 2 (a) and (b).

When a particular sampling time period (T) is mapped by the digital signal processing section 3, the signal output becomes the sampling point and thereby the interval between the signals becomes equal to the sampling time period (T). As shown in FIGS. 2(c) and (d), at the first half of the sampling time period (T), an input switch 16 and an output switch 17 which are connected to a D/A converter 15 on the I channel side are turned on and an input switch 18 and an output switch 19 which are connected to the D/A converter 15 on the Q channel side are turned off. Conversely, at the last half of the sampling time period (T), the input switch 16 and the output switch 17 which are connected to the D/A converter 15 on the I channel side are turned off and the input switch 18 and the output switch 19 which are connected to the D/A converter 15 on the Q channel side are turned on. The D/A conversion of the two channels is conducted by one D/A converter 15. The positions of the switches 16, 17, 18, and 19 are changed by a switch control section 21.

An operational amplifier 20 is placed between the D/A converter 15 and the output switches 17 and 19 to remove the DC offset which is produced by the D/A converter 15.

After that, the signals of the two channels separated by the output switches 17 and 19 pass through low pass filters 8 and 9. After that, the component of the signals whose phase is the same as a reference carrier 12 is modulated by a multiplier 10. The component whose phase is orthogonal to the reference carrier 12 is modulated by a multiplier 11 via a 90° phase shifter. Both the output signals are mixed by an adder 14 and thereby an orthogonally modulated wave is obtained.

As described above, according to the present invention, since the conventional two D/A converters are reduced to one D/A converter, the adjustment work for adjusting the operational amplifier 20 for removing the DC offset is halved. In addition, the conventional balance adjustment for the operational amplifiers is not required because the amplitude of the I channel signal from the D/A converter 15 is the same as that of the Q channel therefrom.

Then, a second embodiment of the present invention will be described.

The modulator of the second embodiment uses a different digital signal processing section from the digital signal processing section 3 in FIG. 1.

Figure 3:
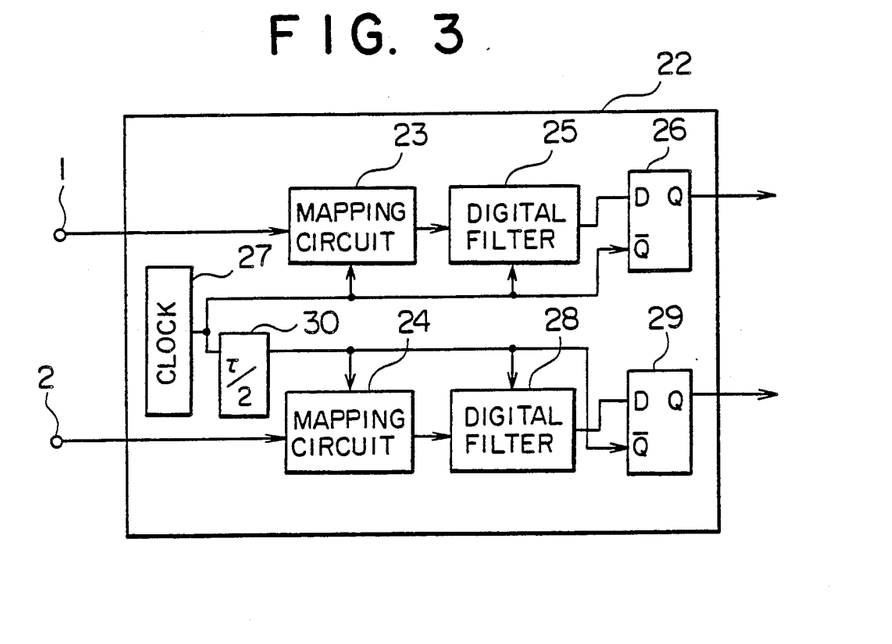
FIG. 3 is a block diagram showing the structure of a digital signal processing section of an modulator of another embodiment of the present invention.

FIG. 3 is a block diagram showing the structure of the digital signal processing section 22.

As shown in the figure, I channel data and Q channel data which are input to the digital signal processing section 22 are mapped by mapping circuits 23 and 24, respectively. In this structure, the signals are mapped at 4 cycles per symbol (see FIGS. 4 (c) and (d)). There is an offset of ½ of the sampling clock time period τ between the sampling point of the mapping of the I channel and that of the Q channel (FIGS. 4 (e) and (f)). The offset is produced in the following manner. A clock 27 is directly supplied to a mapping circuit 23, a digital filter 25, a D flip flop 26, and so forth for the I channel, while the clock 27 which is supplied to a mapping circuit 24, a digital filter 28, a D flip flop 29, and so forth for the Q channel is delayed for τ/2 by a delay circuit 30.

Figure 4:
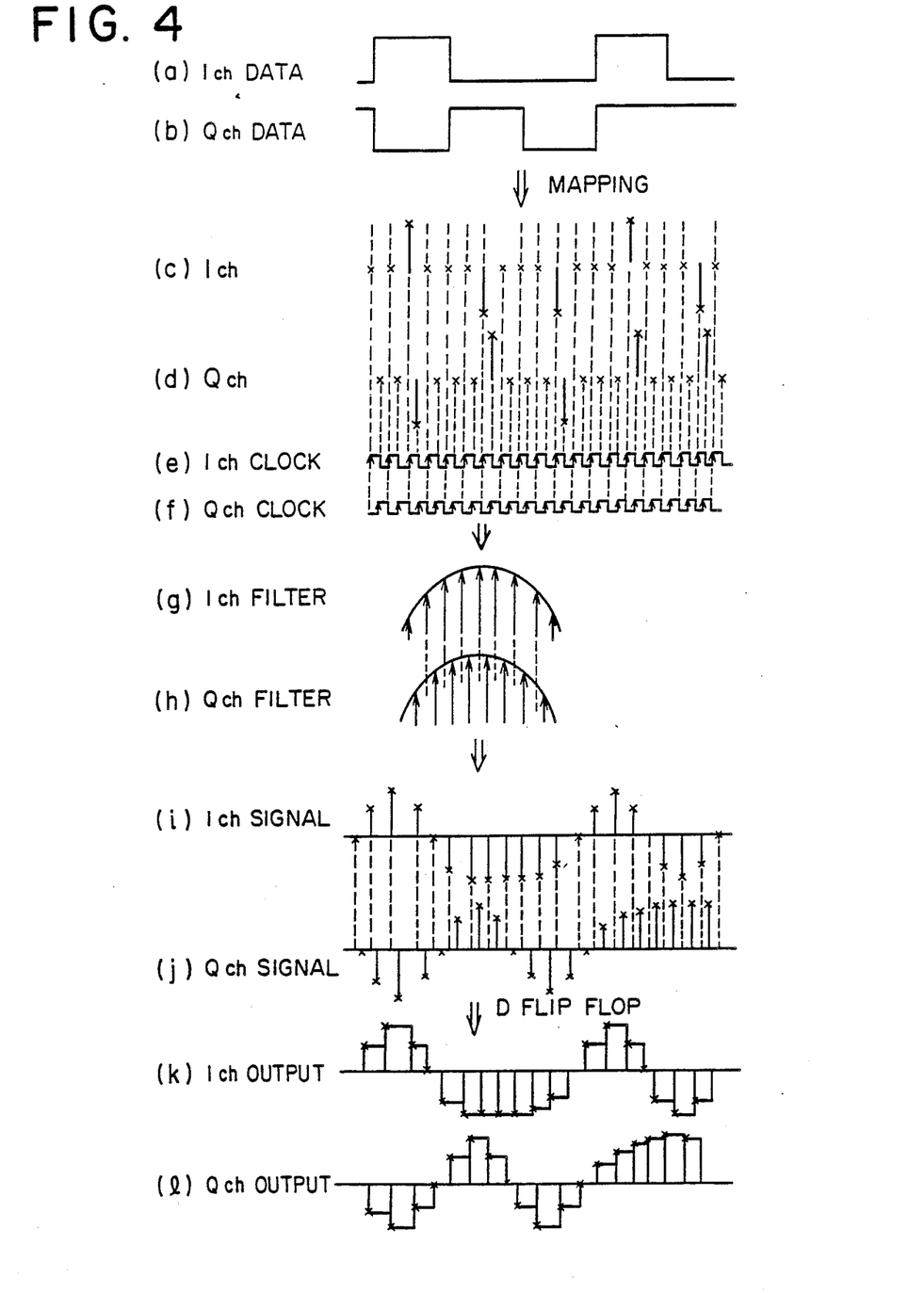
FIGS. 4 and 5 are time charts describing the operation of the embodiment shown in FIG. 3.

After that, the signals are filtered by the digital filters 25 and 28 which are offset according to the sampling points described above and then digital signals of the I channel and the Q channel are obtained (FIGS. 4 (g) to (j)).

The digital signals are held by the D flip flops 26 and 29 from a particular sampling point to the next sampling point so that the D/A converter can compute them (FIGS. 4 (k) and (l)).

Figure 5:
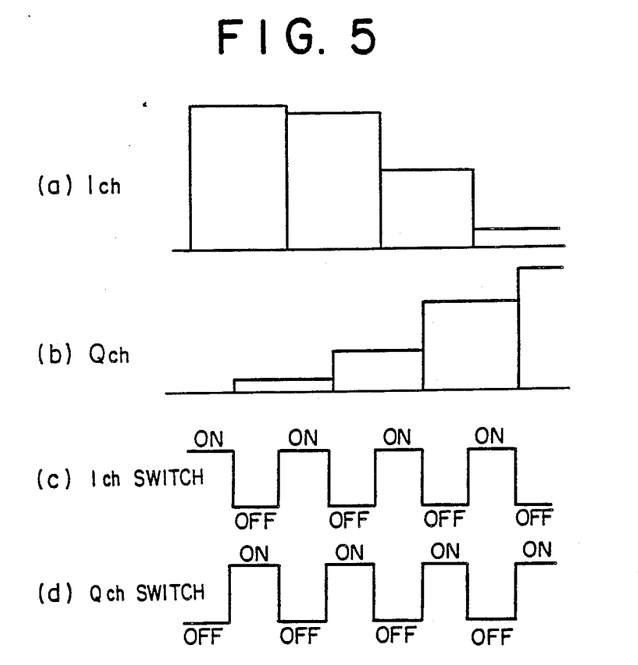

The I channel signal and the Q channel signal where ½ of the sampling clock time period τ is offset are passed through the input switches 16 and 18, the D/A converters 15, the operational amplifier 20, the output switches 17 and 19, the low pass filters 8 and 9, and the multipliers 10 and 11. After that, the signals are mixed by the adder 14 and thereby an orthogonally modulated wave is obtained. The input and output switches 16 to 19 are changed as shown in FIG. 5.

In other words, as described in the embodiment shown in FIG. 1, when the sampling point of the I channel is not offset to that of the Q channel, since the signal where data of the Q channel or the I channel is delayed for ½ of the data sampling time period of the I channel or the Q channel is input to the D/A converter 15, a correct analog signal for the Q channel or the I channel may not be obtained. However, in this embodiment, since the signals are offset and sampled while they are mapped, analog signals without a delay can be obtained for both the I channel and the Q channel.

Then, a third embodiment of the present invention will be described.

Figure 6:
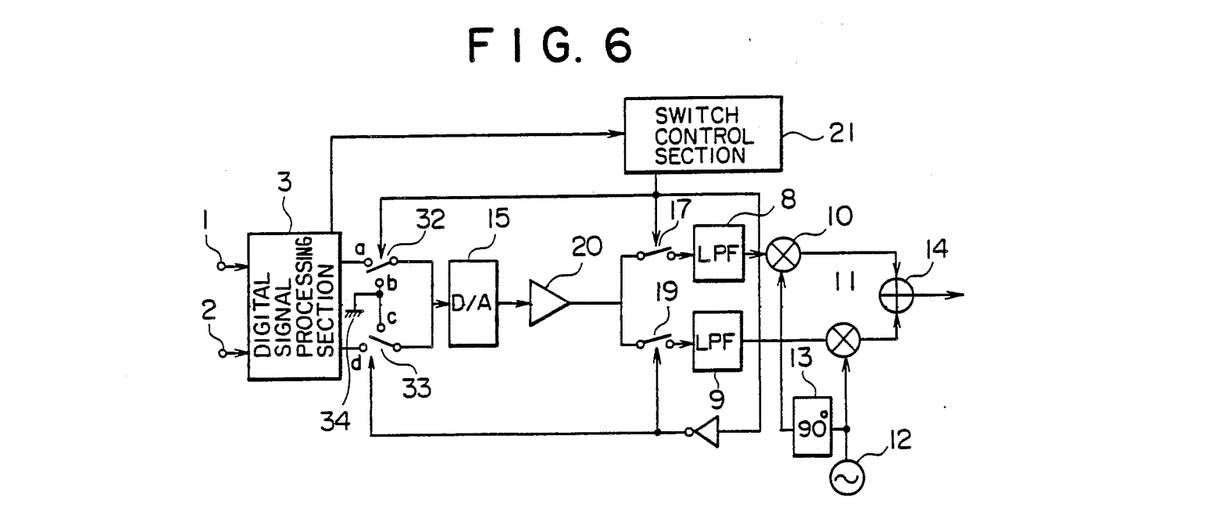
FIG. 6 is a block diagram showing the structure of a modulator of a third embodiment of the present invention.

FIG. 6 is a block diagram showing the structure of a modulator of the third embodiment according to the present invention.

The modulator in the figure uses input switches 32 and 33 which differ from the input switches 16 and 17 shown in FIG. 1.

In this embodiment, the output signals, whose sampling points of the I and Q channels are offset from the digital signal processing section 22 are multiplexed by input switches 32 and 33. The structure of the third embodiment differs from that of the embodiment shown in FIG. 1 as described in the following.

Figure 7:
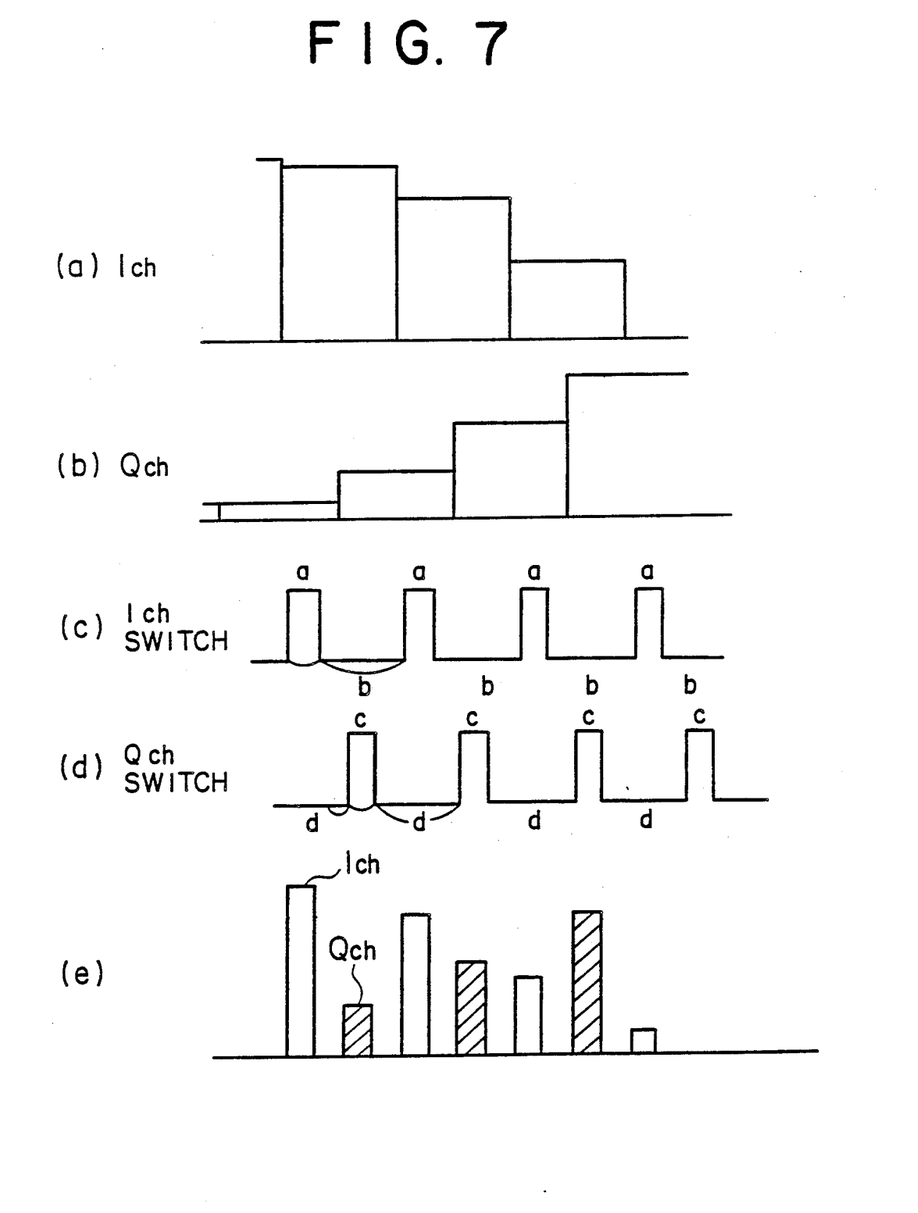
FIG. 7 is a time chart describing the operation of the embodiment shown in FIG. 6.

As shown in FIGS. 7 (a) and (c), assuming that the sampling time period for mapping the signals is $\tau$, the input switch 32 is connected to the position a $\tau/8$ after the I channel signal is sampled and the digital data of the I channel is input to the D/A converter 15. Assuming that the computation time period of the D/A converter 15 is smaller than $\tau/4$, after the input switch 32 is connected to the position a for $\sigma/4$, the switch is connected to the position b which is connected to a ground 34 (0 is input) while $\tau/8$ elapses from the next sampling point, namely for 5 /8 the Q channel, the signal is processed as shown in FIGS. 7 (a) and (b). FIG. 7(e) shows the I channel signal and the Q channel signal which are input to the D/A converter 15.

In this embodiment, the point where the input signal to the D/A converter 15 becomes 0 is provided by using the input switches 32 and 33. Thus, even if an offset is present in the input switches 32 and 33 to some extent, it is possible to prevent the I channel signal and the Q channel signal from being mixed and entered in the D/A converter 15. In addition, since a digital signal which always varies from 0 V is input to the D/C converter 15, no DC offset is present in the output signal of the D/A converter 15. Thus, no adjustment for removing the DC offset is required.

Then, a fourth embodiment according to the present invention will be described.

Figure 8:
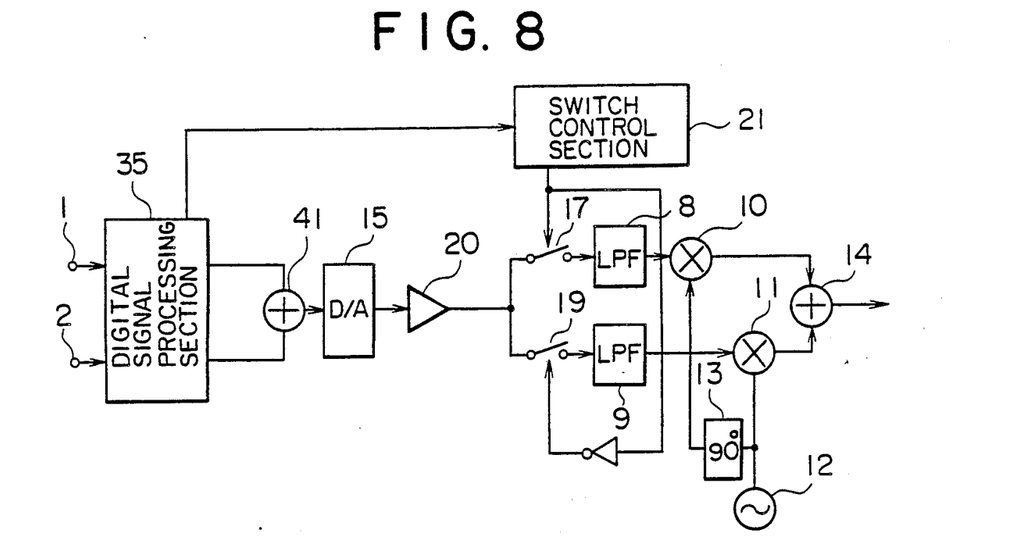
FIG. 8 is a block diagram showing the structure of a modulator of a fourth embodiment according to the present invention.

FIG. 8 is a block diagram showing the structure of a modulator of the fourth embodiment according to the present invention.

As shown in the figure, the I channel data and the Q channel data which are input from the data input points 1 and 2 are input to the digital signal processing section 35.

Figure 9:
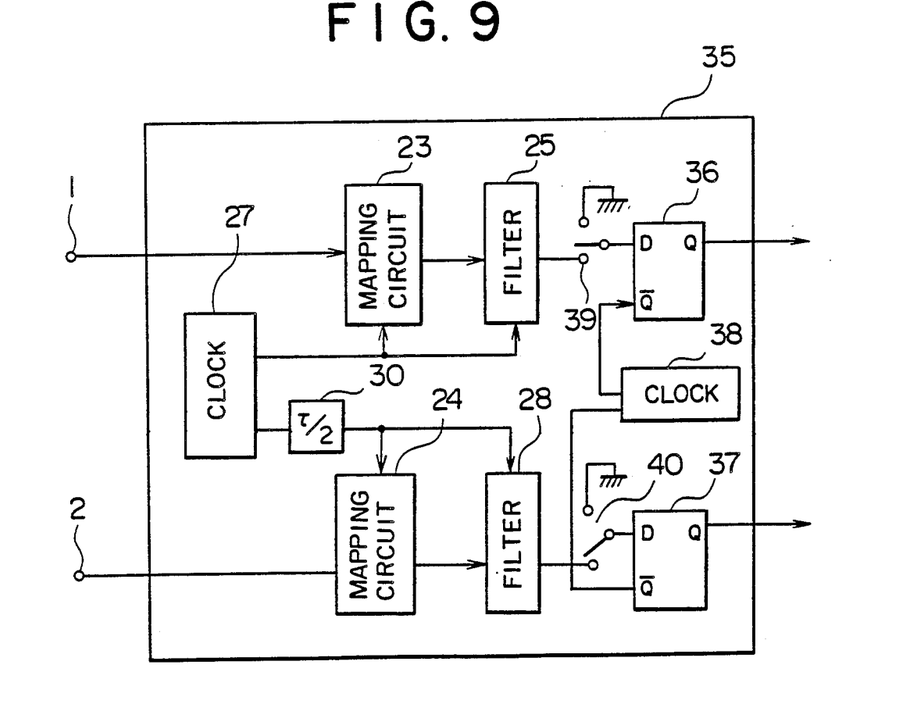
FIG. 9 is a block diagram showing the structure of a digital signal processing section of the modulator of the fourth embodiment according to the present invention.

FIG. 9 is a block diagram showing the structure of the digital signal processing section 35.

Figure 10:
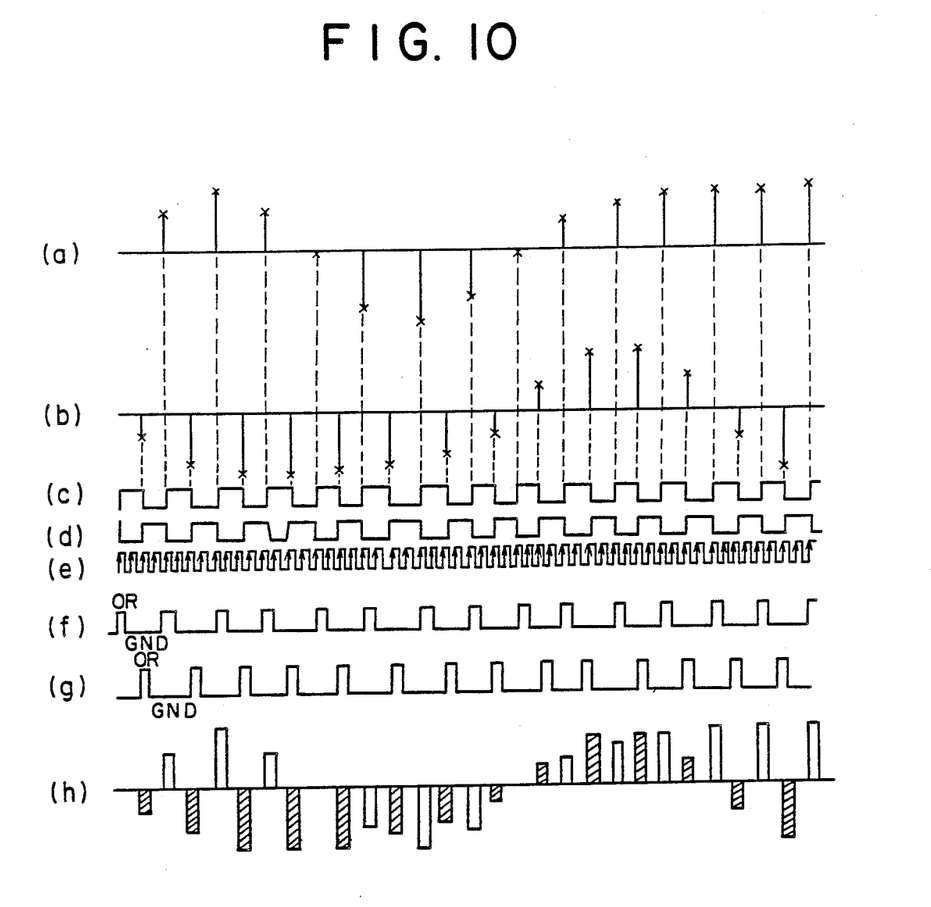
FIG. 10 is a time chart describing the operation of the embodiment shown in FIGS. 8 and 9.

In the digital signal processing section 35, the frequency of the clock 38 of the D flop flops 36 and 37 (FIG. 10 (e)) is twice that of the clock 27 of the digital filters 25 and 28 (FIGS. 10 (c) and (d)). From the digital filters 25 and 28, discrete digital signals for the I channel and the Q channel are output. The sampling points of the digital signals of the I and Q channels are offset (FIGS. 10 (a) and(b)). On the I channel, in the input signal to the D flip flop 36, one clock is used as the digital signal and the later 3 clocks of the signal are grounded by the switch 39 (FIG. 10 (f)). On the Q channel, this operation is conducted in the same manner as on the I channel by the switch 40 (FIG. 10 (g)).

The I channel signal and the Q channel signal are passed through the adder 41, the D/A converter 15, the operational amplifier 20, the output switches 17 and 19, the low pass filters 8 and 9, the multipliers 10 and 11 and then mixed by the adder 14. Thus, an orthogonally modulated wave is obtained. FIG. 10(h) shows an input signal to the D/A converter 15, the I channel output signal and the Q channel signal being mixed by the adder 41 as the input signal.

In this embodiment, the input side switch of the D/A converter 15 shown in FIG. 1 and so forth can be replaced with the adder 41 and thereby the apparatus can be compactly structured.

Then, a fifth embodiment of the present invention will be described.

Figure 11:
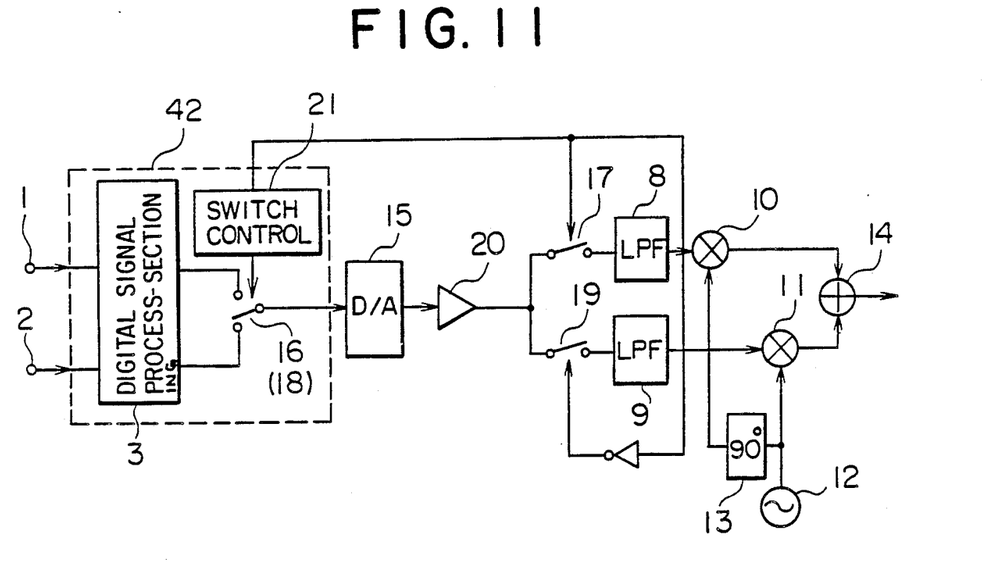
FIG. 11 is a block diagram showing the structure of a modulator of a fifth embodiment according to the present invention.

FIG. 11 is a block diagram showing the structure of the modulator according to the fifth embodiment.

In the modulator shown in the figure, the input switches 16 and 18 and the switch control section 21 shown in FIG. 1 are accommodated in an LSI 42 as well as the digital signal processing section 3.

Since the input switches 16 and 18 and the switch control section 21 are accommodated in the LSI 42 as well as the digital signal processing section 3, the number of output lines for the I channel and the Q channel from the digital signal processing section 3 (FIG. 1) is reduced, respectively. Namely, when the LSI 42 is of 16 bit type, the number of output lines is reduced from 32 lines to 16 lines. Thereby the number of output pins can be reduced.

In addition, the D/A converter 15, the operational amplifier 20, the input and output switches 17 and 18, the low pass filters 8 and 9 can be accommodated in the LSI. Particularly, when the low pass filters 8 and 9 are accommodated in the LSI the clock 7 used in the digital signal processing section 3 can be supplied to a switched capacitor filter that the low pass filters 8 and 9 have and which requires a particular clock.

What is claimed is:

1. In a modulator for converting two digital signals for an I channel and a Q channel in the base band into analog signals and for modulating a component of the signals whose phase is the same as a carrier and another component of the signals whose phase is orthogonal to the carrier, comprising:

signal connection means for connecting the two signals of said I channel and said Q channel to one signal train by time-sharing and multiplexing them;

a digital/analog converter for converting a signal connected by said signal connection means into a analog signal; and signal separation means for separating an output analog signal converted by said digital/analog converter to two analog signals of said I channel and said Q channel.

2. The modulator according to claim 1 wherein a sampling points in the base band of said digital signals are offset between a time axis of said I channel and that of said Q channel.

3. The modulator according to claim 1 wherein said signal connection means causes said adjacent signal trains to be grounded for a particular time period when connecting the two signals to one signal train by time-sharing and multiplexing them.

4. The modulator according to claim 1 wherein a digital signal processing section is provided at least for mapping and filtering signals, said signal connection means being accommodated in said digital signal process section.

5. The modulator according to claim 1 wherein a digital signal processing section is provided at least for mapping and filtering signals, said digital signal processing section and at least one of said signal connection means, said digital/analog converter, and said signal separation means being accommodated in the same LSI.

* * * * *